(12) United States Patent
Krasser et al.

(10) Patent No.: US 11,662,200 B2
(45) Date of Patent: May 30, 2023

(54) SENSOR ASSEMBLY, ACTUATOR, CONTROL SYSTEM, ELECTRICALLY ADJUSTABLE PIECE OF FURNITURE AND METHOD FOR OPERATING AN ELECTRICALLY ADJUSTABLE PIECE OF FURNITURE

(71) Applicant: LOGICDATA Electronic & Software Entwicklungs GmbH, Deutschladsberg (AT)

(72) Inventors: Edwin Krasser, Graz (AT); Stefan Lukas, Preding (AT)

(73) Assignee: LOGICDATA ELECTRONIC & SOFTWARE ENTWICLUNGS GMBH, Deutschlandsberg (AT)

( * ) Notice: Subject to any disclaimer, the term of this patent is extended or adjusted under 35 U.S.C. 154(b) by 45 days.

(21) Appl. No.: 17/048,565

(22) PCT Filed: Apr. 12, 2019

(86) PCT No.: PCT/EP2019/059533
§ 371 (c)(1),
(2) Date: Oct. 16, 2020

(87) PCT Pub. No.: WO2019/201799
PCT Pub. Date: Oct. 24, 2019

(65) Prior Publication Data
US 2021/0239459 A1 Aug. 5, 2021

(30) Foreign Application Priority Data
Apr. 18, 2018 (DE) .................... 10 2018 109 215.6

(51) Int. Cl.
*G01B 11/16* (2006.01)
*A47B 9/20* (2006.01)

(52) U.S. Cl.
CPC ............... *G01B 11/16* (2013.01); *A47B 9/20* (2013.01)

(58) Field of Classification Search
CPC .................. G01B 11/16; A47B 9/20
See application file for complete search history.

(56) References Cited

U.S. PATENT DOCUMENTS 4,763,740 A 8/1988 Pattern
6,539,804 B1 * 4/2003 Iwata ................. G01C 19/5677
73/504.13

(Continued)

FOREIGN PATENT DOCUMENTS

CA 2217150 A1 10/1996
DE 29718426 U1 2/1999

(Continued)

*Primary Examiner* — Hina F Ayub
(74) *Attorney, Agent, or Firm* — Morgan, Lewis & Bockius LLP

(57) ABSTRACT

A sensor assembly for an electrically adjustable piece of furniture having at least one actuator for adjusting a component and a control for the actuator comprises a light transmitter and a light receiver which are coupled to one another via an optical light path. An aperture element which is configured to at least partially cover the light path and which is mounted in a movable manner with respect to the light path in such a way that a change in a position of the aperture element results in a change in the covering of the light path. An evaluation circuit regulates a light quantity emitted by the light transmitter to a reference quantity by means of a control signal and generates a deformation signal based on the control signal or on a signal derived from the control signal. The aperture element converts a deformation or movement of the component into a change of position of the aperture element relative to the light path.

19 Claims, 9 Drawing Sheets

(56) References Cited

U.S. PATENT DOCUMENTS

| | | | |
|---|---|---|---|
| 7,049,728 B2 | 5/2006 | Bastholm | |
| 9,292,009 B2 | 3/2016 | Hille | |
| 9,326,597 B2 | 3/2016 | Lukas et al. | |
| 9,859,774 B2 | 1/2018 | Klinke et al. | |
| 2009/0190620 A1* | 7/2009 | Shou | G11B 7/1263 372/38.07 |
| 2013/0207585 A1* | 8/2013 | Hille | H03K 17/941 318/480 |
| 2013/0293173 A1* | 11/2013 | Strothmann | H02P 3/06 318/466 |
| 2014/0285342 A1 | 9/2014 | Makino et al. | |

FOREIGN PATENT DOCUMENTS

| | | |
|---|---|---|
| DE | 102004035246 B3 | 3/2006 |
| DE | 102004043754 B3 | 4/2006 |
| DE | 102008051794 B3 | 6/2010 |
| DE | 202010005416 U1 | 10/2011 |
| DE | 102011050158 A1 | 11/2011 |
| DE | 102018203549 A1 * | 9/2019 |
| EP | 312332 B1 | 2/1995 |
| EP | 810426 B1 | 4/2000 |
| EP | 1704797 B1 | 8/2011 |
| EP | 2568855 B1 | 4/2014 |
| EP | 2497386 B1 | 8/2014 |
| JP | S646836 A | 1/1989 |

\* cited by examiner

SENSOR ASSEMBLY, ACTUATOR, CONTROL SYSTEM, ELECTRICALLY ADJUSTABLE PIECE OF FURNITURE AND METHOD FOR OPERATING AN ELECTRICALLY ADJUSTABLE PIECE OF FURNITURE

CROSS-REFERENCE TO RELATED APPLICATIONS

The present application is the national stage entry of International Patent Application No. PCT/EP2019/059533, filed on Apr. 12, 2019, which claims the benefit of priority of German Patent Application No. 102018109215.6, filed on Apr. 18, 2018, all of which are hereby incorporated by reference in their entirety for all purposes.

BACKGROUND OF THE INVENTION

The present disclosure relates to a sensor assembly for an electrically adjustable piece of furniture as well as to an actuator, a control system and an electrically adjustable piece of furniture each comprising said a sensor assembly. The present disclosure also relates to a method for operating an electrically adjustable piece of furniture.

Adjustable furniture is well known in the field of office furniture as well as in the home sector. The most common furniture in the office sector are, for example, electrically adjustable tables or chairs, while electrically adjustable beds, seating or reclining furniture are typical examples in the home sector.

In the case of electrically adjustable furniture, for example, there is regularly a risk of collision with an object or part of the body. The collision causes forces to be exerted on elements of the furniture system, resulting in deformation of these elements, e.g. deformation of a table top. There are many concepts to detect this force, e.g. based on strain gauges, or piezo-based force transducers.

In order to avoid injuries to humans/animals or damage to the furniture system, the collision should be detected even at very low forces or deformations. At the same time false triggers should be prevented.

SUMMARY OF THE INVENTION

This disclosure provides an improved measurement concept which allows an exact detection of force effects or deformations of components of an adjustable piece of furniture.

The improved measurement concept is based on the idea that a force applied to moving elements or components of an electrically adjustable piece of furniture causes a deformation of at least one element of the furniture and that this deformation is detected. For this purpose a sensor with a light path between a light transmitter and a light receiver as well as with an aperture element is used. The aperture element can move into the light path to influence the amount of light received by the light receiver. During operation of the sensor, the aperture element is brought into contact, e.g. into force, with the movable element in such a way that a movement or deformation of the element leads to a movement of the aperture element relative to the light path and thus to an influence on the quantity of the received light.

In addition, a control system can be provided which keeps the amount of light received at the light receiver constant by varying the amount of light emitted by the light transmitter. The manipulated variable for the light transmitter resulting from the regulation can serve as a basis for a measure of the movement or deformation or force effect of the adjustable element, for example as a deformation signal. This deformation signal can then be evaluated for collision detection, for example, by evaluating a change in the deformation signal.

The aperture element is, for example, a mechanical aperture that influences the light quantity of the light path in the sensor. The amount of light is influenced by the aperture element, for example by absorption, reflection or scattering. Without deformation, the light receiver receives a defined constant amount of light. This quantity of light can be called the standard light quantity. A change in position of the aperture element relative to the light path changes the amount of light received by the light receiver. As mentioned above, the difference or variation of the received light quantity is compensated by changing the emitted light quantity. If, for example, the deformation leads to a reduction of the received light quantity, then the emitted light quantity is increased until the received light quantity again corresponds to the light quantity without deformation, i.e. the normal light quantity. If the deformation leads to an increase of the received light quantity, then less light is emitted in consequence.

Such a sensor can be used with a wide variety of electrically adjustable pieces of furniture, which include at least one actuator for adjusting an adjustable component of the piece of furniture and a control system for controlling the at least one actuator. Such pieces of furniture are, for example, height-adjustable tables, especially office desks, reclining furniture or seating furniture, especially in the home sector, for example beds or reclining chairs. The adjustable component is for example a table top of a height-adjustable table, or a bed top of an adjustable bed.

For example, a sensor assembly according to the improved measuring concept for such an electrically adjustable piece of furniture comprises a light transmitter and a light receiver, which are coupled to each other via an optical light path. The light receiver is configured to provide a reception signal based on a received amount of light. The sensor assembly further comprises an aperture element which is configured to at least partially cover the light path and which is mounted in a movable manner with respect to the light path in such a way that a change in a position of the aperture element results in a change in the covering of the light path. An evaluation circuit is configured to control an amount of light emitted from the light transmitter via a control signal that is generated based on minimizing a difference between the received signal and a reference signal, and to generate a deformation signal based on the control signal or on a signal derived from the control signal. The sensor assembly is configured to be mounted in the piece of furniture such that the aperture element converts a deformation or movement of the adjustable component into a change in the position of the aperture element relative to the light path.

In various embodiments the evaluation circuit comprises a filter stage and is configured to generate the deformation signal by filtering the control signal or the signal derived from the control signal using the filter stage.

The filter stage can be designed as a low-pass filter stage, whereby a differentiator is connected downstream of the low-pass filter stage. Alternatively the filter stage can be designed as a bandpass filter stage. The use of a bandpass filter has the effect, for example, that on the one hand high-frequency interference signals that have nothing to do with the force or deformation of the component are filtered out and that on the other hand low-frequency slow signal changes that are not caused by a force change due to a collision are suppressed. Since a differentiator also has a high-pass effect, the combination of a low-pass filter and the differentiator ultimately results in the transmission behavior of a bandpass.

In addition to filtering or integrated into filtering, amplification can also be provided, for example to increase the signal range.

In various embodiments, the light path is shorter than 2 cm, in particular shorter than 1 cm. A diameter or width of the light path is for example smaller than 1 mm, especially smaller than 500 µm and is for example about 200 µm. A light area of the light path is therefore smaller than 1 mm$^2$, in particular smaller than 0.25 mm$^2$ and is, for example, in the range of about 0.04 mm$^2$.

For example, the light path is configured as a direct optical connection for the transmission of light from the light transmitter to the light receiver. Optionally, the transmission takes place without the use of reflections. In particular, the light transmission is not based on the reflection of light rays on a surface. Likewise, the transmission is not based on the deformation of an optical fiber and an evaluation of an associated change in the amount of light.

For example, light transmitter and light receiver are arranged on a common printed circuit board. Preferably the light path is parallel or essentially parallel to the surface of the PCB. In particular, an angle between the light path and the surface of the PCB is less than 10°, in particular less than 5°. The direction of movement of the aperture element is optionally perpendicular to the light path or perpendicular to the surface of the printed circuit board. Slight angular deviations, as mentioned above, can be tolerated.

The shape of the aperture element can be selected in different ways. For example, the aperture element has the shape of a cone, a truncated cone, a pyramid, a truncated pyramid, a cylinder, a cuboid, a truncated cone or a shape composed of several of these shapes.

The choice of the shape of the aperture element also results in a cross-sectional area perpendicular to the light path, with which the aperture element penetrates into the light path. The light path forms the normal to this cross-sectional area, so to speak. For example, the cross-sectional area is at least partially formed by at least one of the following shapes: rectangle, triangle, trapezium, circle segment, ellipse segment. For example, the cross-sectional area is formed by the combination of a rectangle with a triangle shape or trapezoid shape or a semicircle shape, without excluding other possible combinations.

Cross-sectional areas with a width varying along the direction of movement can cause a more continuous course of the light quantity change. In particular, when the aperture element penetrates the light path, i.e. when changing from no cover to a partial cover, it may be advantageous if the corresponding end of the aperture element has a smaller width than the light path to allow a continuous transition.

In various embodiments, the printed circuit board has an opening below the light path, with the aperture element mounted movably above and/or in the opening.

In various embodiments, the position of the aperture element in relation to the light path is selected in such a way that in the resting state or without the application of force, the quantity of light emitted is larger by a defined factor compared to the quantity of light received, for example twice as large. This can be achieved, for example, by a defined coverage of the light path by the aperture element in the idle state, e.g. by a coverage of about 50%, especially in the range between 40% and 60%. Thus, movements or deformations in both directions along the direction of movement of the aperture element can be detected.

In various configurations of the sensor assembly, the aperture element is designed for fixed mounting on the adjustable component to produce the change in position of the aperture element relative to the light path. If the sensor assembly is mounted within the furniture, the aperture element is not fixed to the sensor assembly, but is free to move or is only supported by guides.

In an alternative embodiment, the aperture element is elastically mounted in the sensor assembly and is set up to generate the change in position of the aperture element relative to the light path when the adjustable component is touched.

The sensor assembly is optionally arranged in a housing. The housing does not need to be completely closed to allow the action between the aperture element and the adjustable component. The housing may have an open side for this purpose or may provide an appropriate opening to allow penetration by the aperture element.

In various embodiments, the sensor assembly comprises a housing, in particular a separate housing in which the printed circuit board is arranged. In other embodiments, the sensor assembly is integrated, for example, in the actuator or the control system of the piece of furniture.

Accordingly, the improved measuring concept can also be implemented with an actuator for an electrically adjustable piece of furniture with a control system for controlling the at least one actuator, whereby the actuator is configured to adjust an adjustable component of the piece of furniture. The actuator comprises in one embodiment a sensor assembly according to one of the previously described embodiments, whereby the sensor assembly, for example the printed circuit board of the sensor assembly, is arranged in a housing of the actuator. The aperture element is fixed in the actuator in such a way that a deformation or movement of the adjustable component via a deformation or movement of an end shield of the actuator converts the change of the position of the aperture element relative to the light path. For example, the aperture element is rigidly connected to the end shield.

For example, the end shield is used to support a drive shaft of the actuator, which can absorb a force from the adjustable component and transmit it to the end shield.

The end shield can be moved in different configurations by the force effect. The end shield is optionally mounted elastically in the actuator. Alternatively, the end shield can also be deformed by the action of force. In both cases the movement or deformation via the aperture element changes the covering of the light path.

In other embodiments, the sensor module can also be integrated into the control system. Accordingly, the improved measuring concept is also implemented with an embodiment of a control for an electrically adjustable piece of furniture with at least one actuator for adjusting an adjustable component of the piece of furniture, if the control comprises a sensor assembly according to one of the previously described embodiments. The control system is configured to control the at least one actuator and is designed to be mounted onto the adjustable component, whereby the sensor assembly is integrated in a housing of the control system. This can be particularly advantageous for a height-adjustable table as a piece of furniture if the control is intended for mounting under the table top.

For example, the circuit board of the sensor assembly is formed by a circuit board of the control unit. In particular the light transmitter and the light receiver are arranged on the circuit board of the control unit.

In various embodiments, the control system is set up to detect a collision based on the deformation signal, in particular based on a change in the deformation signal, and to stop the at least one actuator in the event of a detected collision and/or to switch a direction of movement of the at least one actuator.

Collision detection is based in particular on detecting fast and/or strong changes in the actuating signal or the deformation signal derived from it, independent of an essentially constant output value, i.e. also independent of an absolute value of the coverage of the light path by the aperture element.

For example, an evaluation of the deformation signal for collision detection is only performed during an adjustment process or operation of the actuator. For this purpose, the sensor module can also be activated only during operation of the actuator or during an adjustment process, while it is deactivated in the idle state, i.e. without adjustment.

Finally, the improved measuring concept is also implemented by an electrically adjustable piece of furniture with at least one actuator for adjusting an adjustable component of the piece of furniture, with a control system for controlling the at least one actuator and with at least one sensor assembly according to one of the previously described embodiments. This includes the possibility of integrating the sensor assembly into the actuator and/or into the control system. The sensor assembly is arranged in the piece of furniture in such a way that the aperture element converts a deformation or movement of the adjustable component into a change of the position of the shutter element relative to the light path.

Further embodiments of the actuator, the control system and the piece of furniture result directly from combinations of the different embodiments of the sensor assembly as described above.

The improved measuring concept is also implemented by a method for operating an electrically adjustable piece of furniture. Such a piece of furniture is equipped with at least one actuator for adjusting an adjustable component of the piece of furniture and with at least one sensor assembly. The at least one sensor assembly comprises a light transmitter and a light receiver, which are coupled to each other via an optical light path, and an aperture element. The aperture element is configured to at least partially cover the light path and which is mounted in a movable manner with respect to the light path in such a way that a change in a position of the aperture element results in a change in the covering of the light path.

According to the method, a first quantity of light is emitted from the light transmitter via the light path to the light receiver. The light receiver generates a reception signal based on a second light quantity received via the light path. A deformation or movement of the adjustable component is converted into a change of the position of the aperture element relative to the light path, for example by force transmission from the component. The first amount of light is controlled by a control signal, which results from minimizing a difference between the received signal and a reference signal. A deformation signal is generated based on the control signal or on a signal derived from the control signal. Based on the deformation signal, in particular based on a change in the deformation signal, a collision of the adjustable component is detected. If a collision is detected, a movement of the at least one actuator is stopped. Alternatively or additionally in this case a direction of movement of the at least one actuator is switched over.

Further embodiments of the method result directly from the different embodiments of the sensor assembly, the actuator, the control system and the piece of furniture, which have been described in detail above. This concerns in particular the generation, processing and evaluation of the different signals used.

BRIEF DESCRIPTION OF THE DRAWINGS

In the following, the invention is explained in detail on the basis of exemplary embodiments with reference to the drawings. Components which are functionally identical or have an identical effect may be provided with identical reference marks. Identical parts or parts with identical function may be explained only with reference to the figure in which they first appear. The explanation is not necessarily repeated in subsequent figures.

In the figures.

DETAILED DESCRIPTION

Figure 1:
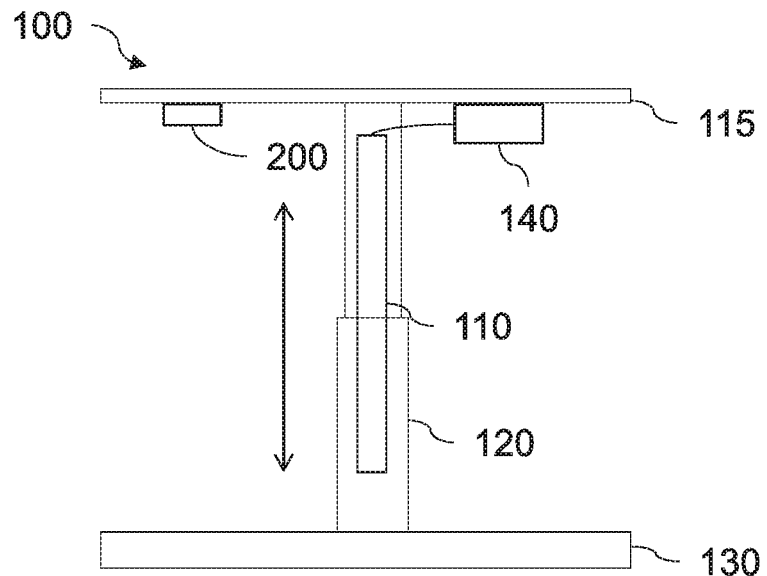
FIG. 1 shows an exemplary embodiment of a furniture system with an electrically adjustable piece of furniture in the form of a table.

FIG. 1 shows an exemplary embodiment of a furniture system with an electrically adjustable piece of furniture in the form of a table 100. The table 100, for example, is designed as a height-adjustable table, in particular as an office table, whereby a table top 115 can be adjusted in height via an actuator 110, which is arranged in a table frame 120. The actuator 110 is controlled by a control unit 140, for example, while the table frame 120 is designed as a telescopic column, for example. The table 100 also includes a table base 130.

A sensor assembly 200 is also attached to the table top 115, which can be used to detect the effect of a force on the table top 115, whereby the effect of the force causes a deformation of the table top 115 and this deformation is detected by the sensor assembly 200. A possible application of such a sensor assembly 200 is, for example, the detection of a force due to a collision of the table top 115 with another object or body.

In particular, the sensor module 200 has a communication connection to the control system 140, not shown, in order to transmit corresponding signals. This can be wired or wireless. Deviating from the illustration in FIG. 1, the sensor assembly 200 may also be integrated in the control unit 140.

The function and mode of operation of the sensor assembly 200 is explained in detail using the following figures. For example, FIG. 2A, FIG. 2B and FIG. 2C show different states, especially deformation states, of a sensor assembly that can be used in a piece of furniture.

Figure 2A:
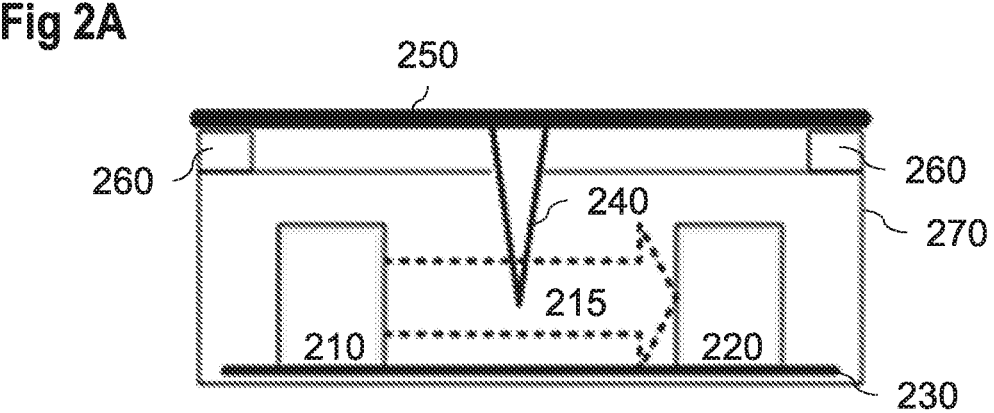
FIGS. 2A-C show different representations of an exemplary embodiment of a sensor assembly according to the improved measurement concept.

With reference to FIG. 2A, an exemplary embodiment of a sensor assembly 200 is shown, which contains a printed circuit board 230, on which a light transmitter 210 and a light receiver 220 are arranged, which are optically coupled to each other via a light path 215. Light transmitter 210 and light receiver 220 can also be arranged in the sensor assembly without a PCB 230. An aperture element 240 extends into the light path 215, which in this version is firmly connected to a component 250. A housing 270 of the sensor assembly is mounted to component 250 via fasteners 260. Component 250 is, in particular, an adjustable component of a piece of furniture, which can be deformed during an adjustment process, especially in case of a collision during an adjustment process.

Figure 2B:
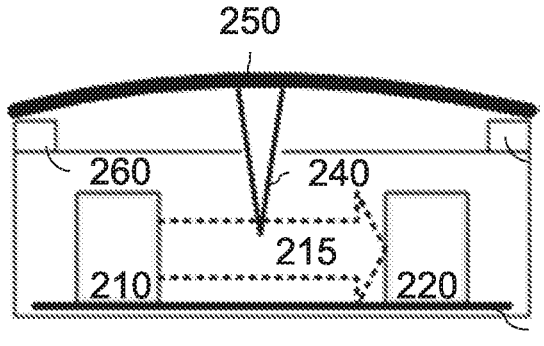
Figure 2C:
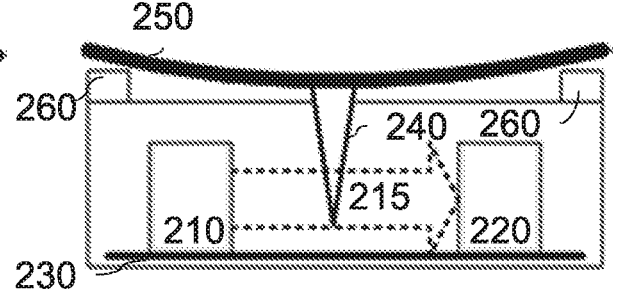

While FIG. 2A shows the sensor assembly in an idle state, in FIG. 2B the component 250 is of a slightly convex shape, so that the aperture element 240 extends less far into the light path 215. Conversely, in FIG. 2C, component 250 is domed downward so that the aperture element 240 extends further into light path 215.

The arrangement shown leads to the fact that the aperture element 240 allows more or less light to pass between light transmitter 210 and light receiver 220 via the light path 215, depending on the deformation. In other words, the aperture element 240 realizes a position dependent attenuation of the emitted light.

A control circuit not shown, which is explained in connection with FIG. 5, ensures in the sensor assembly that despite different coverage of the light path 215 by means of the aperture element 240, the same amount of light impinges onto the light receiver 220 by adjusting the amount of light emitted by the light transmitter 210. For example, a higher coverage of the light path 215 leads to an increased quantity of emitted light, and vice versa.

The component 250, for example, corresponds the table top 115. During operation of the table shown in FIG. 1, collisions with another object or body can occur, which cause the table top to deform. For example, a deformation of the table top upwards could lead to more light being received, which results in a reduction in the amount of light emitted. A downward deformation would result in a smaller amount of received light, which would increase the amount of emitted light. Depending on the mechanical arrangement of aperture element 240, the conditions could also be reversed.

Determining the amount of light currently emitted gives information of a relative measure for the momentary coverage of the light path 215 by the aperture element 240, or of the deformation or of the acting force. The distance between light transmitter 210 and light receiver 220 is small, for example less than 2 cm, in particular less than 1 cm. Light transmitter 210 and light receiver 220 operate in the infrared light range, for example.

In various embodiments, the circuit board 230 has an opening under the light path 215 through which the aperture element 240 can be passed. As shown schematically, the aperture element 240 optionally moves perpendicular to the light path 215 or to the surface of the PCB 230. If necessary, deviations in the range of 5° to 10° are possible. Thus, the light path 250 or the parallel PCB 230 forms a kind of reference line to which the deformation refers.

The light transmission via the light path 215 from the light emitter 210 to the light receiver 220 is based on direct optical transmission and is in particular not dependent on reflectors or similar devices that catch stray light from the light path 215 or otherwise transmit light from the light emitter 210 to the light receiver 220. The use of one or more optical fibers is also not required.

The shape of the aperture element 240 can be selected in different ways. For example, aperture element 240 has the shape of a cone, truncated cone, pyramid, truncated pyramid, cylinder, cuboid, truncated cone or a shape composed of several of the above-mentioned forms combined.

Figure 3:
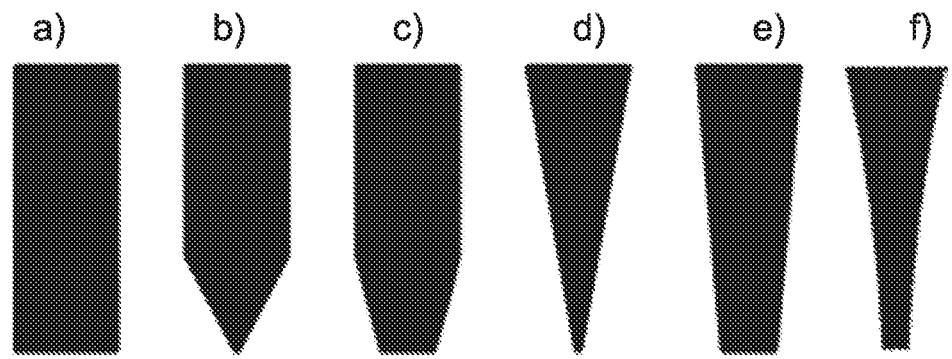
FIG. 3 shows various examples of possible embodiments of a cross-section of an aperture plate element.

Depending on the shape of the aperture element 240, a specific cross-section or a cross-sectional area of the aperture element 240 is formed, which is perpendicular to the light path 215. With reference to FIG. 3, various cross-sectional areas for the aperture element are shown there in a non-exhaustive list. The area a) forms a rectangle. The area b) is formed by a rectangle and a triangular tip. Similarly, the area c) is formed by a rectangle with a trapezoidal tip. The area d) has a triangular shape. The area e) has a trapezoidal shape. The area f) has a funnel shape. Other shapes or partial shapes not shown are for example a segment of a circle or a segment of an ellipse. For example, the cross-sectional area is formed by combining a rectangle with a semicircle shape, without excluding other possible combinations.

Figure 4A:
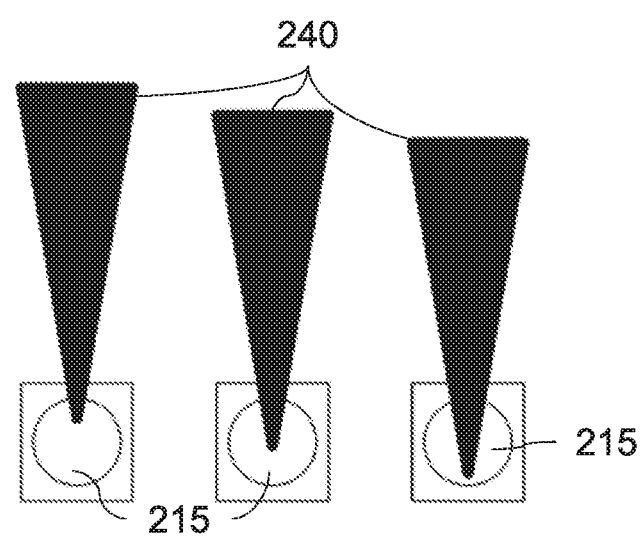
FIGS. 4A-B show examples of detailed representations of the sensor assembly.
Figure 4B:
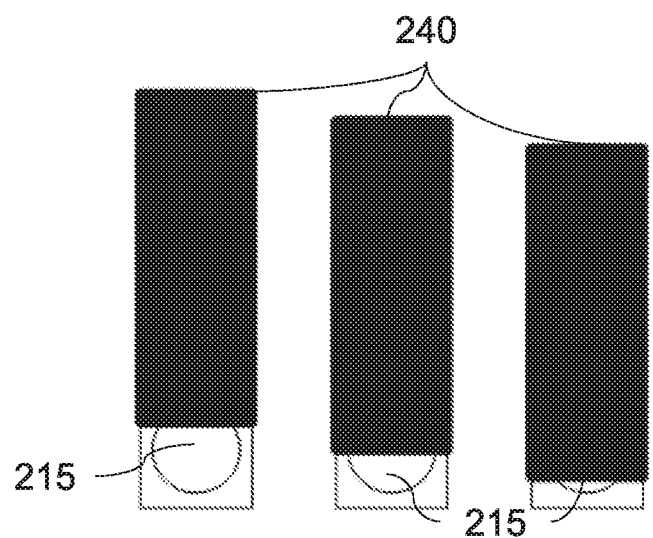

FIGS. 4A and 4B each show top views of the light path 215 together with a cross-sectional area of an aperture element 240, with three different degrees of coverage shown.

In FIG. 4A, the cross sectional area of aperture element 240 has a triangular or trapezoidal shape so that when the aperture element 240 is moved into the light path 215, the latter is not suddenly interrupted. Rather, the amount of light received changes continuously as the cone of the aperture element 240 extends further into the light path. This means that manufacturing tolerances of the aperture element 240 or the position of the light path 215 in relation to the aperture element 240 are less critical.

In the illustration in FIG. 4B, aperture element 240 has a rectangular cross-sectional area which, depending on the degree of coverage of light path 215, can lead to a rather sudden interruption of light path 215. In addition, small movements of aperture element 240 can lead to relatively large changes in the amount of light received. This can lead to the fact that manufacturing tolerances must be observed very precisely in order to avoid a too sensitive reaction. However, such an implementation is still not excluded.

Regardless of the shape of the cross-sectional area, for example, the position of the aperture element 240 within the light path 215 is selected so that without the application of force, i.e. in a resting or idle state, the quantity of light emitted is greater than the quantity of light received by a predefined factor, for example approximately twice as much. With reference to FIG. 4A and FIG. 4B, this corresponds, for example, to the respective coverage illustrated in the center panel.

Figure 5:
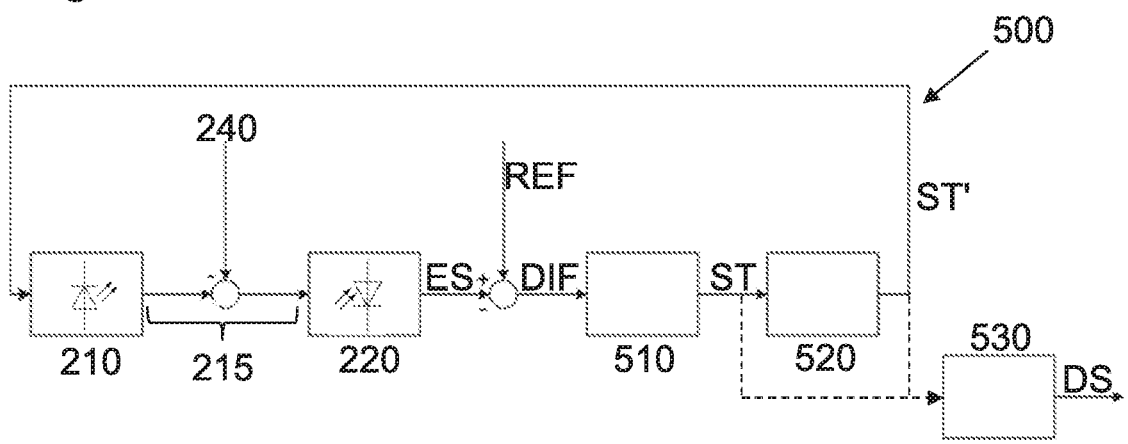
FIG. 5 shows an example of a block diagram of signal processing in the sensor assembly according to the improved measurement concept.

With reference to FIG. 5, an example of a block diagram 500 of the control loop of sensor assembly 200 is shown. Central elements are the light emitter 210 and the light receiver 220, which is configured to provide a reception signal ES based on a received light quantity. The light path 215 is shown as a connection between light emitter 210 and light receiver 220 with an additional differential element, which takes into account the coverage by aperture element 240. The received signal ES is compared with a reference signal REF to determine a differential signal DIF which is fed to a controller 510. The controller 510 generates a control signal ST from this signal which is fed to an actuator 520 which in turn generates an actuating signal ST' which is used to control the amount of light emitted by the light emitter 210.

For example, the light emitter 210 is a LED or a laser and the light receiver 220 is a photodiode, so that, for example, the current through the LED or laser is defined by the control signal ST'. The brightness control of light-emitting diodes or other light-emitting elements is sufficiently known and will therefore not be discussed in detail at this point. The essential idea is to keep the received light quantity or the resulting received signal ES constant.

The block diagram 500 also contains a processing block 530, which generates a deformation signal DS from the control signal ST or the control signal ST'. The processing element 530, for example, features a combination of amplification and filtering that prepares the control signal ST or the control signal ST' in such a way that it can be evaluated more reliably.

The control signal ST is used, for example, as a measure of the degree of deformation or the force applied to the adjustable component or the position or change in position of aperture plate 240.

Typically, a bandpass is used as a filter to filter out high-frequency interfering signals that have nothing to do with the application of force on the one hand, and to suppress low-frequency slow signal changes that are not caused by a change in force due to a collision on the other.

In order to optimize the control signal ST or the control signal ST' with regard to the detection of the change in the force effect, a differentiator can also be used in block 530. Since a differentiator also has a high-pass effect, a low-pass filter in combination with the differentiator can also achieve a band-pass behavior instead of a band-pass filter.

With a differentiator it can be achieved in particular that signal changes in the control signal ST are better visible in the signal course and thus easier to evaluate, because the differentiator can generate pulse-like signal courses at the output from fast voltage changes at its input.

Filter, amplifier and differentiator are not only to be seen as sequentially arranged, individual circuit groups, but can also be combined at least partially or completely with operational amplifier circuits, for example.

Figure 6A:
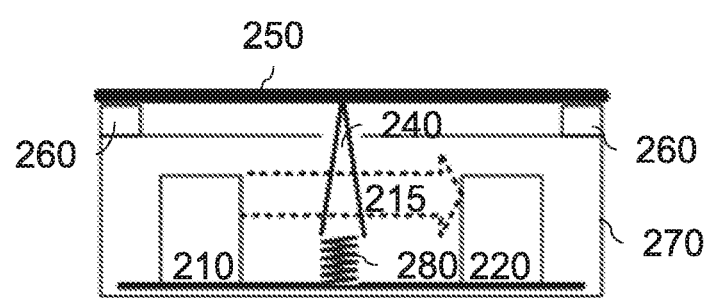
FIGS. 6A-C show different representations of another exemplary embodiment of a sensor assembly according to the improved measurement concept.
Figure 6B:
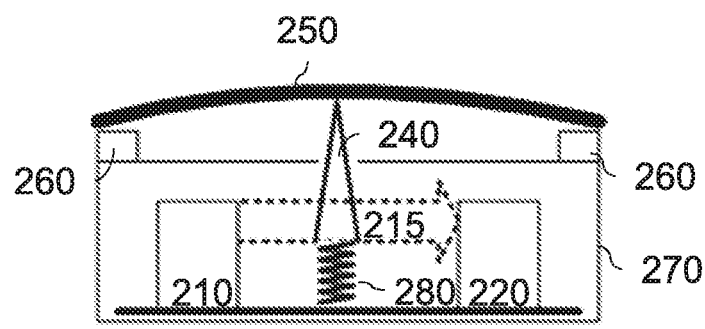
Figure 6C:
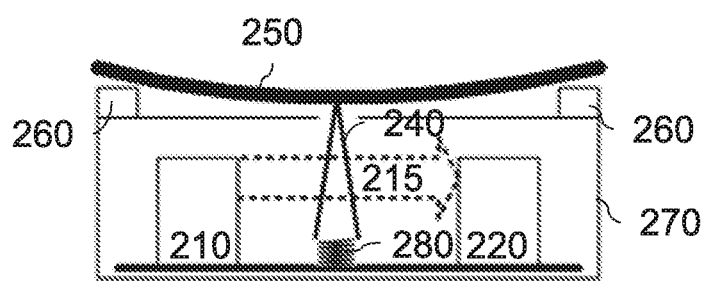

FIGS. 6A, 6B and 6C show an alternative design of the sensor assembly in different deformation states, similar to FIGS. 2A, 2B and 2C. In contrast, the aperture element 240 is not rigidly attached to the component 250, but is elastically supported in the sensor assembly, in particular on the printed circuit board 230. The elastic support is shown in FIGS. 6A, 6B and 6C by means of a spring element, which, however, can also be implemented with other elastic bodies instead of a spiral spring.

In these embodiments, a force is transmitted between component 250 and aperture element 240 exclusively via contact between the two elements. In addition, deformation of component 250 in turn causes a change in the position of aperture element 240 and thus a change in the degree of coverage of the light path 215. However, with the shown arrangement of the aperture element 240, with reference to FIG. 6B, if component 250 is curved outwards, the degree of coverage is increased, so that the amount of light that is emitted by transmitter 210 is increased. Conversely, with reference to FIG. 6C, if component 250 is downwardly curved, the degree of coverage of light path 215 by aperture element 240 is reduced so that the amount of light emitted by light emitter 210 can be reduced in order to maintain a constant amount of light received by the light receiver 220.

Figure 7A:
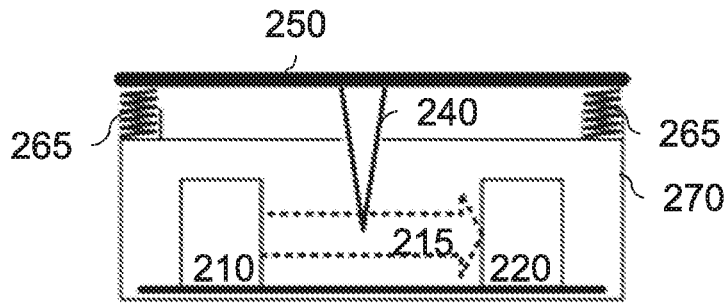
FIGS. 7A-C show different representations of another exemplary embodiment of a sensor assembly according to the improved measurement concept.
Figure 7B:
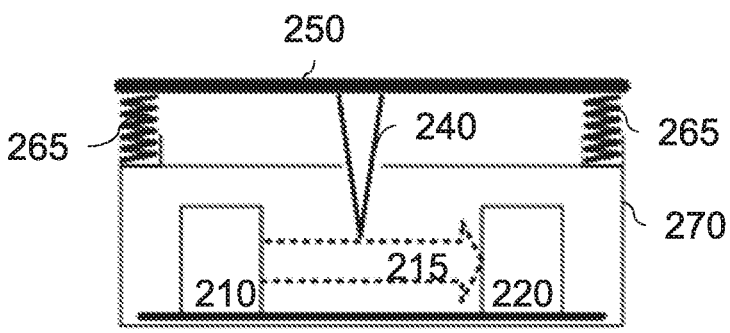
Figure 7C:
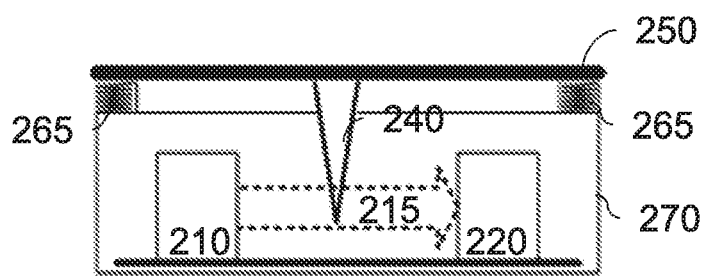

FIGS. 7A, 7B, and 7C show a further embodiment of a sensor assembly, which is an alternative to the embodiments shown in FIGS. 2A, 2B, and 2C and FIGS. 6A, 6B, and 6C, respectively. Again, the individual FIGS. 7A, 7B and 7C represent different load conditions.

In the embodiment shown, the housing 270 of the sensor assembly is attached to component 250 via elastic or spring fasteners 265. The aperture element 240 is rigidly attached to component 250 similar to FIGS. 2A, 2B and 2C. When component 250 is moved by appropriate force, the degree of coverage of light path 215 changes.

In the different embodiments, the sensor assembly is shown with its own housing 270. This enables the sensor assembly to be placed on the piece of furniture independently of the control unit, in particular on the adjustable component, in order to detect the application of force or deformation or movement there. If required, it is also possible to attach several such sensor assemblies, each with its own housing, to a piece of furniture. This can be useful to increase the detection accuracy of a larger adjustable component on which at least two sensor assemblies are mounted. Alternatively or additionally this can be useful if the piece of furniture has several different adjustable components on which at least one sensor assembly is mounted.

Alternatively, the sensor assembly can also be integrated directly into a housing of the control unit. In this case, the light path 215 with the light emitter 210 and light receiver 220, for example, is directly provided on a circuit board of the control system. This can be particularly advantageous for a control system for an electrically height-adjustable table, which is mounted on the height-adjustable table top, for example.

Figure 8:
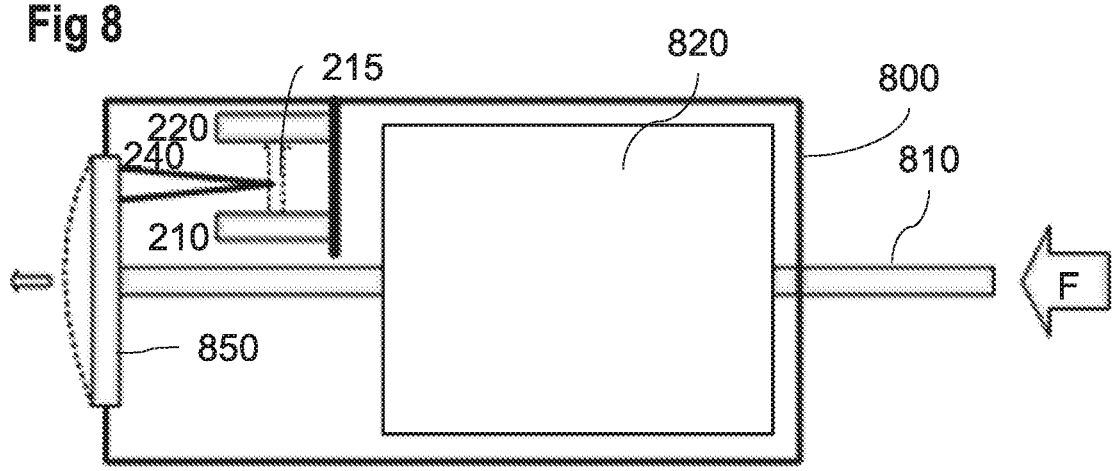
FIG. 8 shows an example of an actuator with a sensor assembly according to the improved measurement concept.

FIG. 8 shows an example of an actuator, especially a linear actuator 800, where the sensor assembly is located in a housing of the actuator. The actuator 800, for example, has a drive shaft 810, which is driven by an electric motor 820 and is supported in a housing of the actuator by means of an end shield 850. The electric motor 820 can comprise a gear. On the output side, i.e. in the FIG. 8 on the right side, any conventional mechanics can be connected to convert the rotary motion of the motor into a longitudinal motion, for example, or similar.

During operation of the actuator 800, a force F, shown by the arrow on the right side, usually acts in the axial direction of the drive shaft 810 and thus also on the end shield 850. In this design, the aperture element 240 is rigidly connected to the end shield. The end shield 850 itself, for example, has a certain elasticity or is elastically mounted in the housing. This means that there are similarities or analogies to the design shown in FIGS. 7A, 7B and 7C. In particular, if the end shield 850 is deformed or moved, the aperture element 240 is inserted more or less deeply into the light path 215, from which a deformation signal can be determined according to the principle described above.

Figure 9:
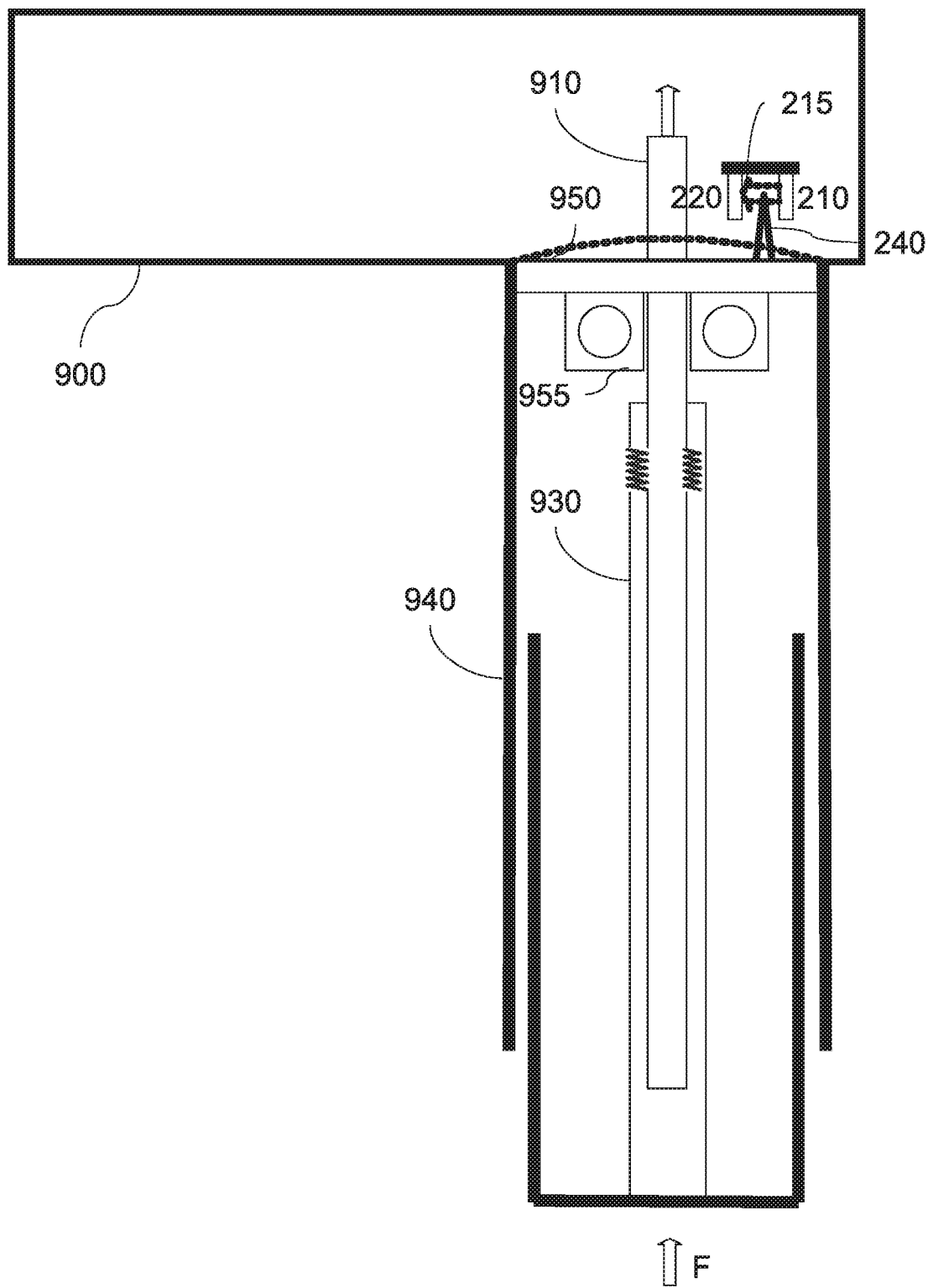
FIG. 9 shows a further example of an actuator with a sensor assembly according to the improved measurement concept.

FIG. 9 shows another exemplary design of an actuator in the form of a linear actuator 900, which is designed as an angular drive in deviation from the previously described design. For reasons of clarity, the motor and angular gear are not shown. In the figure shown is the adjustment mechanism 930 with a spindle driven by a drive shaft 910. The adjustment mechanism 930 is surrounded by a telescopic housing 940. Furthermore, the actuator 900 has a bearing shield 950 with a bearing 955 shown as a ball bearing, for example. The aperture plate element 240 is also rigidly connected to the bearing 950 in this version. The end shield 950 itself has a certain elasticity or is elastically mounted in the housing.

Similar to the design of FIG. 8, during operation of the actuator 900, a force F, shown by the arrow on the bottom of the housing 940, usually acts in the axial direction of the drive shaft 910 and thus also on the end shield 950. Again, if the end shield 950 is deformed or moved, the aperture element 240 is inserted more or less deeply into the light path 215, from which a deformation signal can be determined according to the principle described above.

Figure 10:
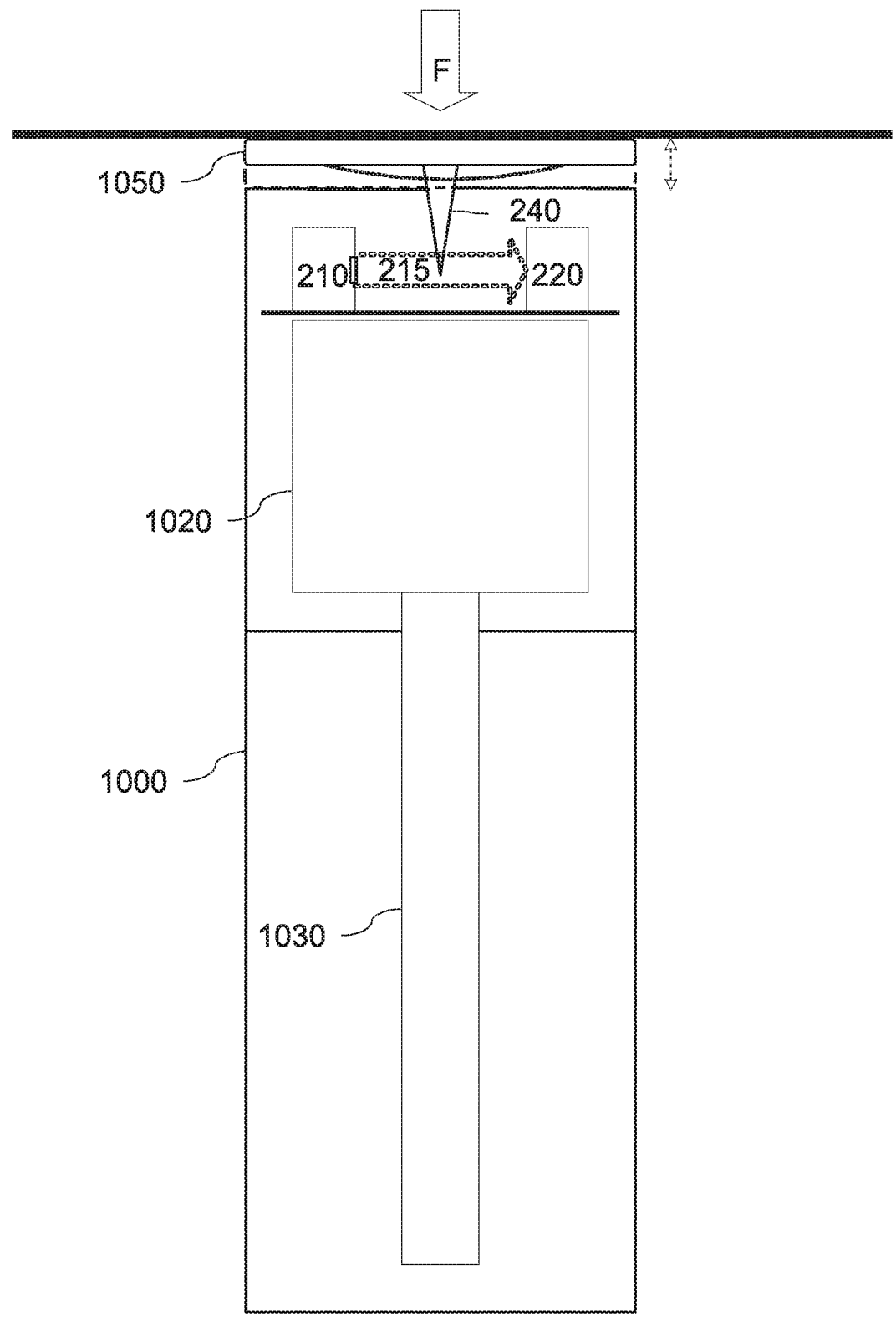
FIG. 10 shows a further example of an actuator with a sensor assembly according to the improved measurement concept.

FIG. 10 shows another example of an actuator in the form of a linear actuator 1000. The linear actuator 1000 has, among other things, an electric motor 1020 with or without a gear and an adjustment mechanism 1030, shown as a spindle, to cause a length change of the actuator 1000. In contrast to the embodiment of FIG. 8, the aperture element 240 is attached to an elastic element 1050, which is positively connected to a component of the adjustable piece of furniture, for example a table top 115 or the like, and to an upper side of the actuator 1000.

With the appropriate application of force, represented by the force arrow F, the elastic element 1050 can be compressed and/or deformed, which ultimately leads to a relative change in position of the aperture element 240 with respect to the light path 215. For example, the application of force changes the thickness of the elastic element 1050, which is schematically shown with the shaded or full-surface filling of the elastic element 1050. In addition, the elastic element can also be bent to follow a deformation of the component, which in turn leads to a relative change in position of the aperture element 240 with respect to the light path 215. The elastic element 1050 can also be described as a damper or buffer and is made of a rubber-like material, for example.

The change in position of the aperture element 240 can be used to determine a deformation signal according to the principle described above.

The different embodiments of the sensor assembly can be used as an individual single sensor, integrated in a control system or integrated in an actuator, in various electrically adjustable furniture. As a first example, we refer to the implementation for an electrically height-adjustable table shown in FIG. 1.

Figure 11A:
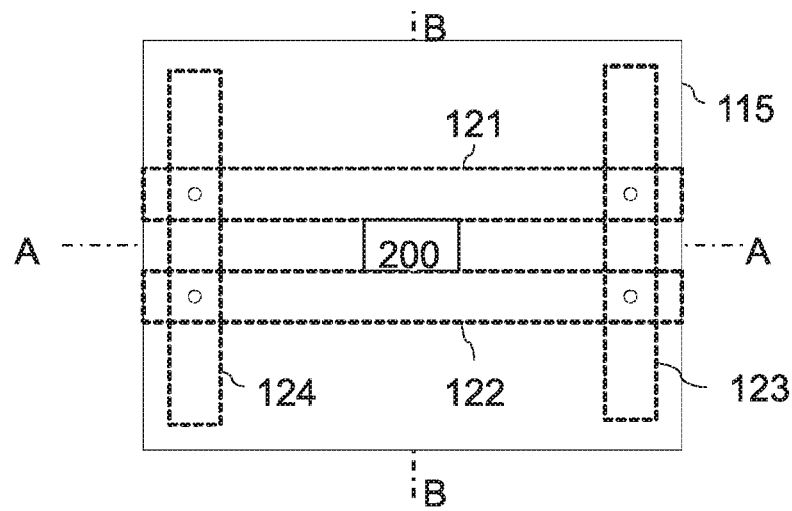
FIGS. 11A-D show different representations of an exemplary embodiment of a sensor assembly according to the improved measurement concept for a table.

For example, FIGS. 11A, 11B, 11C, and 11D show different views of another embodiment of a sensor assembly with an adjustable piece of furniture, here formed by a table. In contrast to the previously described designs, the relative movement between aperture element 240 and the light path 215 is not realized with a rigidly arranged light path 215 and a movable aperture element 240 but with a rigidly arranged aperture element 240 and a movable light path 215. In detail:

FIG. 11A shows a top view of a table top 115 of a height-adjustable table. The table top 115 is mounted on cross beams 121, 122 and on longitudinal beams 123, 124 and, for example, is firmly connected to the beams 121-124 at their intersections, marked by the respective connection points. The connection can be made by screws, for example. The sensor assembly 200 is mounted between the cross beams 121, 122.

Figure 11B:
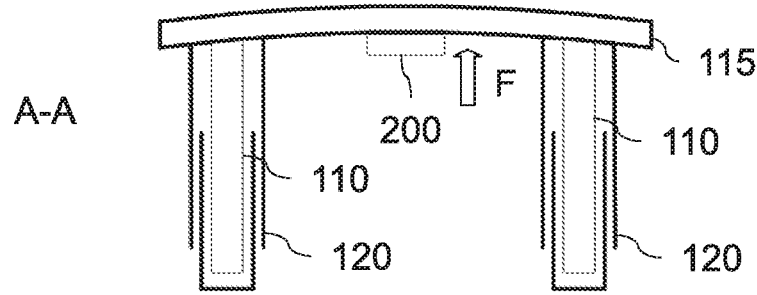

FIG. 11B shows a side view of the table along the section line A-A. The table top 115 is deformed by a force from below, i.e. it is arched upwards. This can happen, for example, if the table top 115 is moved downwards and encounters an obstacle under the table top 115.

Figure 11C:
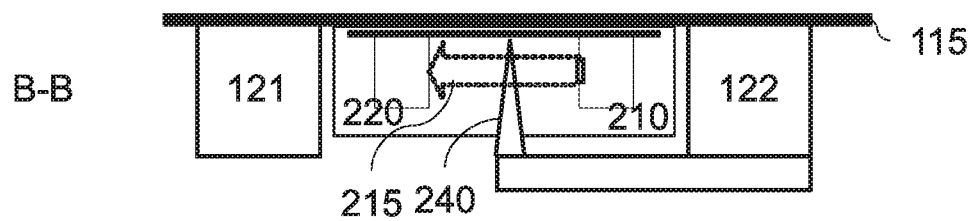
Figure 11D:
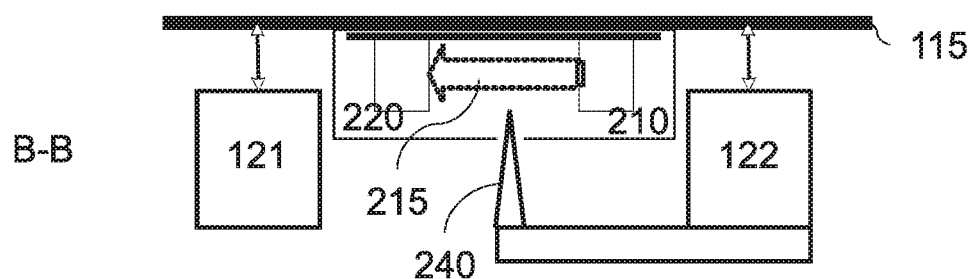

FIGS. 11C and 11D show a side view of the table along the section line B-B. The aperture element 240 is attached to one of the crossbars 121, 122 by means of a corresponding bracket on crossbar 122.

While FIG. 11C depicts the table at rest or idle, FIG. 11D depicts a condition such as in FIG. 11B, where the tabletop 115 is curved upwards in the area of the sensor assembly 200 and therefore no longer lies flush on the supports 121, 122.

Since the sensor assembly 200 is mounted on the table top 115, the sensor assembly 200 moves upwards with the table top 115 and thus changes its position relative to the aperture element 240. In this case, therefore, movement of the sensor assembly 200 results in a change in the position of the aperture element 240.

If the table top 115 releases the collision with the obstacle by moving upwards, it rests again on the longitudinal beam due to its elasticity or gravity.

In this version, the sensor assembly 200 can also be integrated into the control unit of the adjustable furniture, so that with reference to FIG. 1, the control unit 140 with integrated sensor assembly 200 is mounted between the supports 121, 122.

Figure 12:
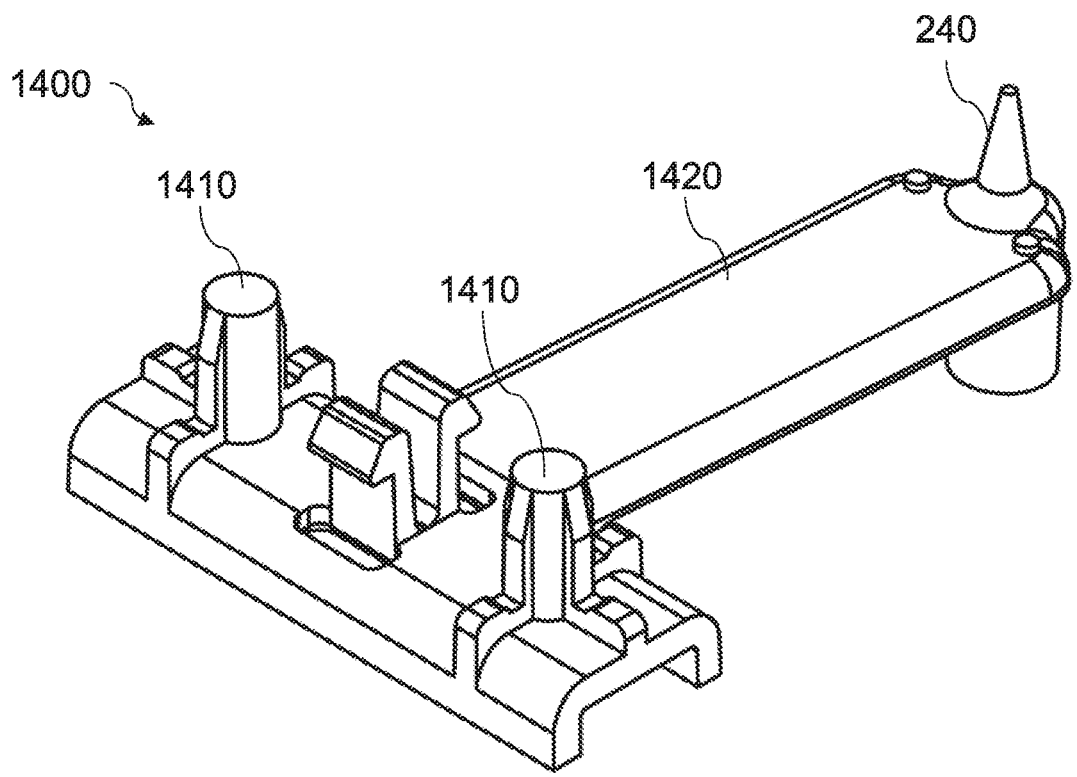
FIGS. 12 and 13 show a further example of a sensor assembly according to the improved measurement concept.

FIG. 12 shows a design example of a holder 1400 of a sensor assembly 200 for the elastic mounting of the aperture element 240 according to the improved measuring concept. The holder 1400 comprises pins 1410 with which it is inserted into corresponding mounting holes 1530 in the PCB 230. This means that the position of the holder 1400 in relation to the light barrier 215 on the PCB 230 cannot change, thus ensuring that the aperture element 240 is centrally located in the light beam to ensure correct functioning. The fixture also has an elastic arm 1420, which has the aperture element 240 at the freely movable, elastic end.

Figure 13:
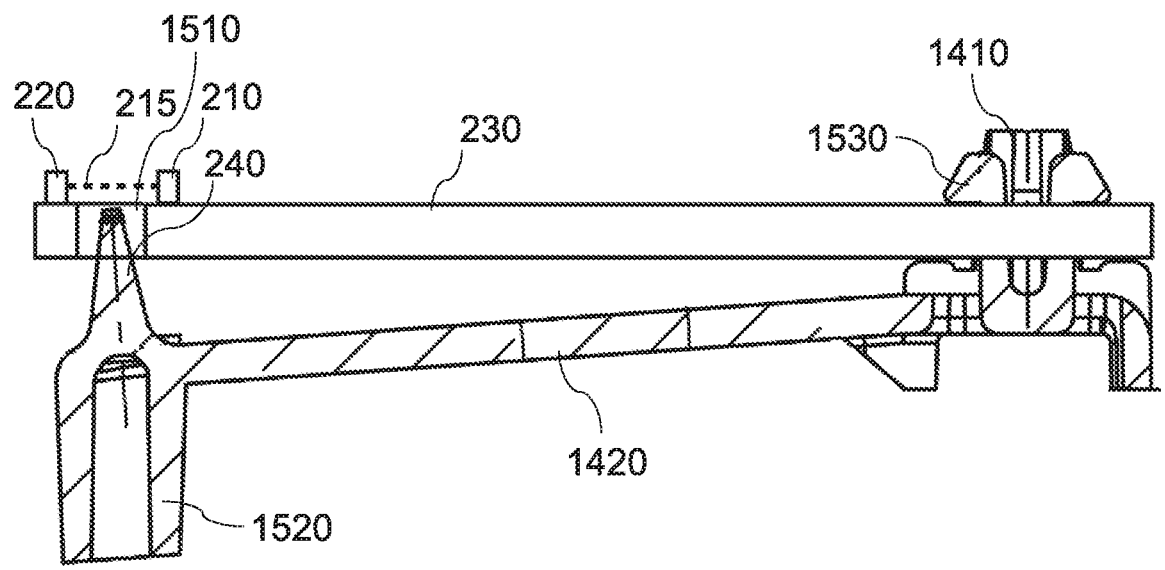

With reference to FIG. 13, the bracket 1400 is mounted on one side of the PCB 230, facing away from the side of the PCB 230 with the light path 215. The aperture element 240 protrudes into the light path 215 through a corresponding opening 1510 of the PCB 230. The cylindrical part 1520 of the bracket 1400 opposite the aperture element 240 is led out through a housing 270 of the sensor assembly 200. A force exerted on this cylindrical part, such as by an adjustable component 250 of a piece of furniture, will cause a change in the position of the aperture element 240 in the light path 215. FIG. 13 shows the position of the aperture element 240 when no force is exerted in an idle state, for example.

Figure 14:
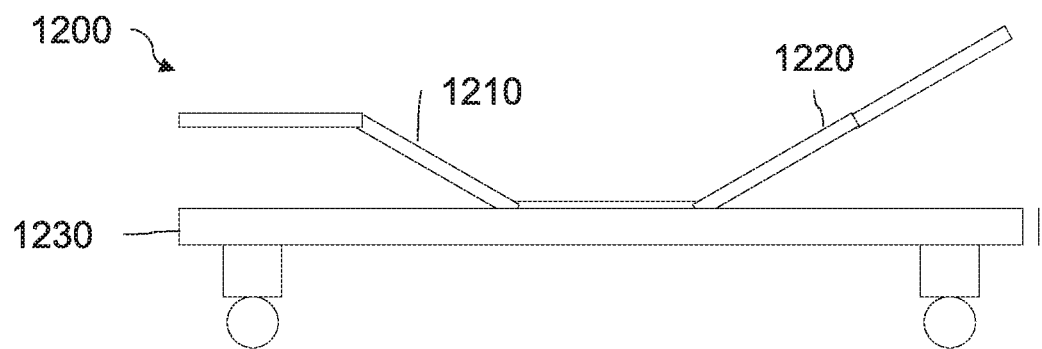
FIG. 14 shows an example of a furniture system with an electrically adjustable piece of furniture in the form of a bed.

Another possibility is, for example, the implementation in an electrically adjustable bed, as shown in FIG. 14. In particular, the piece of furniture in FIG. 14 is designed as a bed 1200, with adjustable foot section 1210 and/or adjustable head section 1220, which are mounted in a bedstead or bed frame 1230. Corresponding actuators are not shown for reasons of clarity. Similar to the embodiments described above, a control unit 140 and one or more sensor assemblies 200 may be arranged in a frame or rack of bed 1200 or in the foot section 1210 or head section 1220, for example. Foot section 1210 and/or head section 1220 can be designed with plates on which one or more sensor assemblies 200 are arranged. Such plates may, for example, represent a variant of component 250. For example, such arrangements can be used to detect collisions of a movement of the foot section 1210 and/or the head section 1220, whereby the sensor assemblies are optionally attached to these elements.

Figure 15:
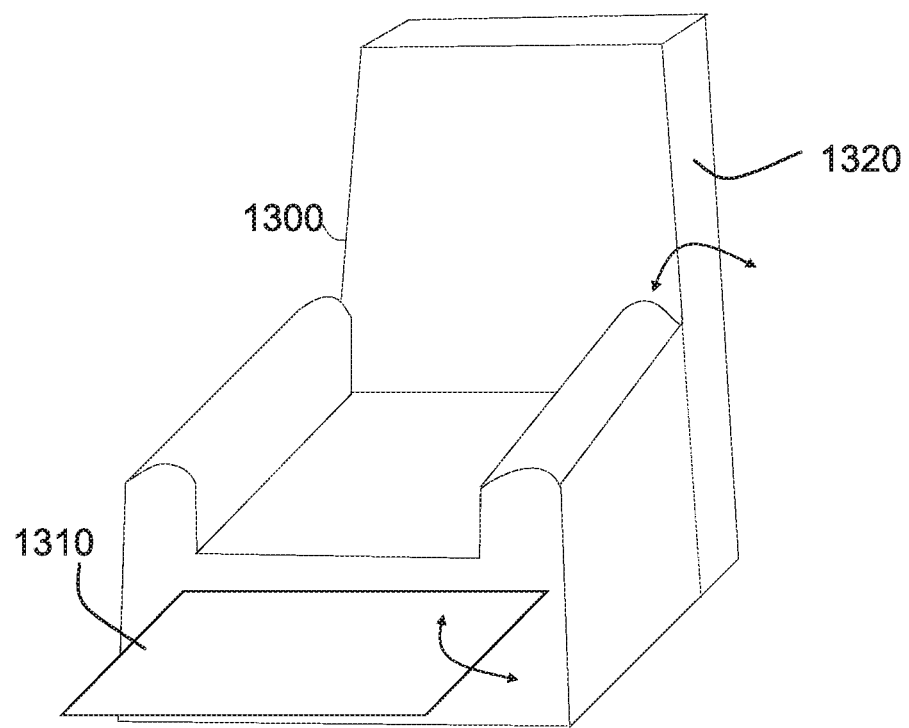
FIG. 15 shows an example of a furniture system with an electrically adjustable piece of furniture in the form of a recliner.

FIG. 15 shows another possible embodiment, in which the piece of furniture is designed as an adjustable recliner 1300. For example, the recliner 1300 has an adjustable back section 1320 and/or an adjustable footrest 1310. Corresponding sensor assemblies, which can be used to detect a collision, are installed in or on the adjustable components 1310, 1320, for example.

The use of the sensor assembly in other adjustable furniture is not excluded.

The invention claimed is:

1. A sensor assembly for an electrically adjustable piece of furniture, which comprises at least one actuator that includes and is to be driven by an electric motor and that is adapted for adjusting an adjustable component of the piece of furniture and a control system for controlling the at least one actuator, the sensor assembly comprising:
   a light transmitter and a light receiver coupled to each other via an optical light path, wherein the light receiver is configured to provide a reception signal based on a received amount of light;
   an aperture element which is configured to at least partially cover the light path and which is mounted in a movable manner with respect to the light path in such a way that a change in a position of the aperture element results in a change in a covering of the light path; and
   an evaluation circuit configured to control an amount of light emitted from the light transmitter via a control signal that is generated based on minimizing a difference between the reception signal and a reference signal, and to generate a deformation signal based on the control signal or on a signal derived from the control signal;
   wherein the sensor assembly is configured to be mounted in the piece of furniture such that the aperture element is configured to convert a deformation or movement of the adjustable component of the piece of furniture into a change in the position of the aperture element relative to the light path.

2. The sensor assembly according to claim 1, wherein the evaluation circuit comprises a filter stage and is configured to generate the deformation signal by filtering the control signal or the signal derived from the control signal using the filter stage.

3. The sensor assembly according to claim 2, wherein the filter stage is designed as a low-pass filter stage and a differentiator is connected downstream of the low-pass filter stage, or wherein the filter stage is designed as a band-pass filter stage.

4. The sensor assembly according to claim 1, wherein the light path is shorter than 2 cm, in particular shorter than 1 cm.

5. The sensor assembly according to claim 1, wherein the light path is a direct optical connection for transmitting light from the light transmitter to the light receiver, in particular without a use of reflections.

6. The sensor assembly according to claim 1, wherein the aperture element has a shape of any one of the following:
   a cone;
   a truncated cone;
   a pyramid;
   a truncated pyramid;
   a cylinder; and
   a cuboid.

7. The sensor assembly according to claim 1, in which the aperture element comprises a cross-sectional area perpendicular to the light path which is at least partially formed by at least one of the following shapes:
   a rectangle;
   a triangle;
   a trapezoid;
   a circle segment;
   a ellipse segment.

8. The sensor assembly according to claim 1, wherein the aperture element is adapted to be fixedly mounted to the adjustable component for producing the change in position of the aperture element relative to the light path.

9. The sensor assembly according to claim 1, where the aperture element is mounted elastically in the sensor assembly and is arranged to produce the change in position of the aperture element relative to the light path via touching of the adjustable component.

10. The sensor assembly according to claim 1, wherein the light transmitter and the light receiver are arranged on a common printed circuit board.

11. The sensor assembly according to claim 10, wherein the light path is parallel or substantially parallel to a surface of the printed circuit board.

12. The sensor assembly according to claim 10, wherein the printed circuit board has an opening below the light path, the aperture element being mounted movably above and/or in the opening.

13. The sensor assembly according to claim 10, further comprising a housing in which the printed circuit board is arranged.

14. The at least one actuator for the electrically adjustable piece of furniture, wherein the piece of furniture comprises the control system for controlling the at least one actuator, the at least one actuator for being driven by the electric motor and set up for adjusting the adjustable component of the piece of furniture, and the sensor assembly according to claim 1, wherein the sensor assembly is arranged in a housing of the at least one actuator and the aperture element is fixed in the at least one actuator in such a way that a deformation or movement of the adjustable component via a deformation or movement of an end shield of the at least one actuator is convertible into the change in the position of the aperture element relative to the light path.

15. The control system for the electrically adjustable piece of furniture, wherein the piece of furniture comprises the at least one actuator that is to be driven by the electric motor and is adapted for adjusting the adjustable component of the piece of furniture, the control system, and the sensor assembly according to claim 1, wherein the control system is configured to control the at least one actuator and is configured to be mounted onto the adjustable component, and wherein the sensor assembly is integrated in a housing of the control system.

16. The control system according to claim 15, wherein a printed circuit board of the sensor assembly is formed by a printed circuit board of the control system.

17. The control system according to claim 15, wherein the control system is configured to detect a collision based on the deformation signal, in particular based on a change in the deformation signal, and to stop the at least one actuator in the event of a detected collision and/or to switch over a direction of movement of the at least one actuator.

18. An electrically adjustable piece of furniture, comprising:
- at least one actuator that includes and is to be driven by an electric motor and that is adapted for adjusting an adjustable component of the piece of furniture;
- a control system for controlling the at least one actuator; and
- at least one sensor assembly,
- wherein the at least one sensor assembly comprises:
  - a light transmitter and a light receiver coupled to each other via an optical light path, wherein the light receiver is configured to provide a reception signal based on a received amount of light;
  - an aperture element which is configured to at least partially cover the light path and which is mounted in a movable manner with respect to the light path in such a way that a change in a position of the aperture element results in a change in a covering of the light path; and
  - an evaluation circuit configured to control an amount of light emitted from the light transmitter via a control signal that is generated based on minimizing a difference between the reception signal and a reference signal, and to generate a deformation signal based on the control signal or on a signal derived from the control signal;
- wherein the at least one sensor assembly is mounted in the piece of furniture in such a way that the aperture element is configured to converts a deformation or movement of the adjustable component of the piece of furniture into the change in position of the aperture element relative to the light path.

19. A method for operating an electrically adjustable piece of furniture comprising at least one actuator that includes and is to be driven by an electric motor and that is adapted for adjusting an adjustable component of the piece of furniture, and at least one sensor assembly, the at least one sensor assembly having a light transmitter and a light receiver which are coupled to one another via an optical light path, as well as an aperture element which is configured to at least partially cover the light path and which is mounted in a movable manner with respect to the light path in such a way that a change in a position of the aperture element results in a change in a covering of the light path, the method comprising:
- transmitting a first quantity of light from the light transmitter via the light path to the light receiver;
- generating, by means of the light receiver, a reception signal based on a second amount of light received via the light path;
- converting a deformation or movement of the adjustable component of the piece of furniture into a change in the position of the aperture element relative to the light path;
- controlling a first amount of light by means of a control signal that results from minimizing a difference between the reception signal and a reference signal;
- generation of a deformation signal based on the control signal or on a signal derived from the control signal;
- detecting, based on the deformation signal, in particular based on a change in the deformation signal, a collision of the adjustable component of the piece of furniture; and
- terminating a movement of the at least one actuator and/or switching a direction of movement of the at least one actuator in case of a detected collision.

* * * * *